United States Patent [19]

Brewer et al.

[11] 3,766,498
[45] Oct. 16, 1973

[54] METHOD AND APPARATUS FOR PRODUCING ELECTROMAGNETIC TRANSIENT COHERENT EFFECTS

[75] Inventors: Richard G. Brewer, Palo Alto; Richard L. Shoemaker, San Jose, both of Calif.

[73] Assignee: International Business Machines Corporation, Armonk, N.Y.

[22] Filed: Apr. 6, 1972

[21] Appl. No.: 241,721

[52] U.S. Cl. .............................. 332/7.51, 350/160
[51] Int. Cl. ............................................. H01s 3/10
[58] Field of Search ................. 331/94.5; 332/7.51; 350/160

[56] References Cited
UNITED STATES PATENTS
2,714,660  8/1955  Hershberger ........................ 250/36
3,581,228  5/1971  Smith ............................ 331/94.5 C OTHER PUBLICATIONS
Brewer et al., "Precision 1-F Stock Spectro of $N^{14}H_2P$ Using Lamb Dip," 9/15/69, Pg. 559–563, P.R.L., Vol. 23, No. 11.
Brewer, "Precision . . . of $CH_3F$ . . . Spectroscopy," 12/14/70, Pg. 1639–1641, P.R.L., Vol. 25, No. 24.
Landman et al., "Electroptic Modulation . . . Gases," 6/69, Pg. 330, IEEE, S.Q.R., Vol. QR–5, No. 6.

Primary Examiner—Benjamin A. Borchelt
Assistant Examiner—N. Moskowitz
Attorney—Melvyn D. Silver et al.

[57] ABSTRACT

Electromagnetic transient coherent effects such as photon echo and optical nutation are produced by directing cw laser radiation into a gaseous medium such as $C^{13}H_3F$ and $NH_2D$, contained in a Stark cell, and by applying Stark pulses which shift the molecular levels into resonance with the cw laser radiation. The effects lend themselves to applications in optical modulation, data communication, superradiance, spectroscopy, memory and pulse height to frequency conversion, among others.

20 Claims, 10 Drawing Figures

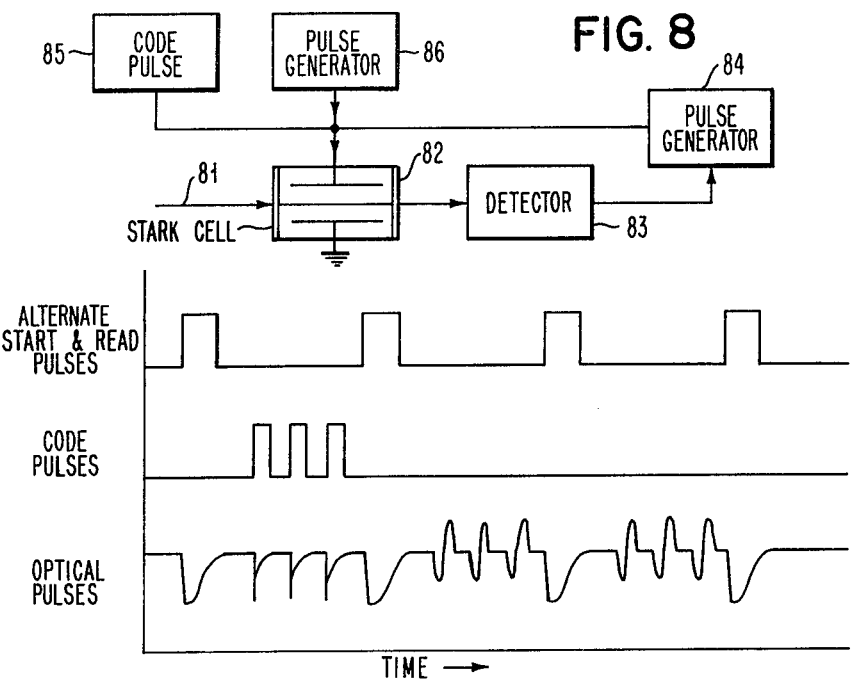
FIG. 8
FIG. 9
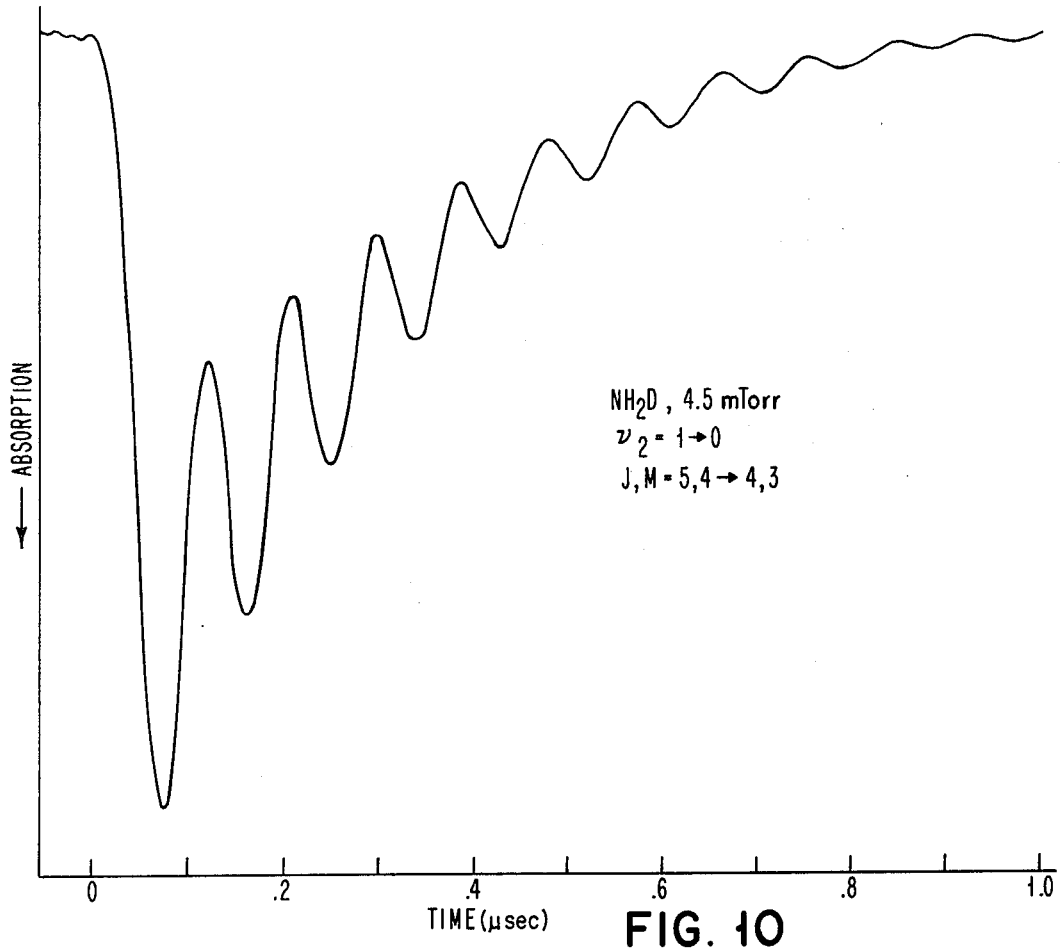
NH$_2$D, 4.5 mTorr
$\nu_2 = 1 \rightarrow 0$
J,M = 5,4 → 4,3
FIG. 10

METHOD AND APPARATUS FOR PRODUCING ELECTROMAGNETIC TRANSIENT COHERENT EFFECTS

FIELD OF THE INVENTION

Means and methods for producing electromagnetic transient coherent effects such as photon echo, optical nutation, and optical free induction decay such as for signal modulation effects.

BACKGROUND OF THE INVENTION

The molecular Stark effect has been used in the past to amplitude modulate infrared laser beams, but only under steady state conditions. An example of this approach is by A. Landman, H. Marantz, and V. Early, Applied Physics Letters 15, 357 (1969). The bandwidth in this case is typically less than the Doppler width or ~30 MHz.

A distinguishing feature in this invention from the prior art is that the molecular-optical interaction is a transient coherent effect. This transient molecular response not only allows a greater modulation depth (complete inversion is possible) but a greater bandwidth as well. For example, GHz bandwidths at ~50 percent modulation depth are feasible at low pulse drive powers (<100V) and low laser power (~few watts). The optical response time or bandwidth is of course determined by roughly one-half the nutation period $\mu_{ij} \epsilon/2\hbar$ where $\epsilon$ is the optical field strength and $\mu_{ij}$ is the transition matrix element.

By comparison, infrared electrooptic modulators require very large drive powers for 50 percent modulation (>1000V). Existing acoustooptic modulators can be efficient but are limited to <100MHz bandwidths.

Further, in the past it has been difficult to generate photon echoes or control them so that they could be used in a memory device. These experiments (and only three have been performed: in ruby, $SF_6$, and Cs vapor) have been limited to the use of single pulse laser sources where output is not readily changed. For example, it has been difficult to control such variables as the number of pulses, their delay, or their width. As a result, very awkward optical geometries have been required to produce even a two pulse sequence in echo experiments.

The present invention departs entirely from this approach making possible a variety of optical memory devices. Since the laser operates cw and the molecular absorption is electronically gated, the pulse sequence may be tailored to the particular application. The number of pulses, their delay time, pulse width and repetition rate can be varied at will.

As examples, mirror photon echoes and stimulated photon echoes have been readily observed for the first time using the apparatus of FIG. 1. The use of these effects as the basis for a pulse train inverter (FIG. 6) and for a recirculating storage device (FIG. 8) are now feasible and would not have been using a single pulse laser source.

Thus, the objects of this invention include providing a means and a method for producing electromagnetic transient coherent effects. Further, other objects include utilizing these effects which include optical nutation, photon echo and optical free induction decay toward optical pulse generation, optical modulation, data communication, photon echo memory devices, pulse train inversion, pulse height to frequency conversion, molecular spectroscopy, superradiance, and optical radar, among other applications.

SUMMARY OF THE INVENTION

A cw laser beam is directed through an absorbing molecular gas sample before being monitored by a photo detector. The gas cell contains two plates which are driven by an electronic pulse generator. The effect of these electric pulses (Stark pulses) is to change the molecule's optical transition frequency by means of the Stark effect. In this way, the molecule is shifted into or out of resonance with the laser frequency, and thus the optical absorption is electronically controlled. Each Stark pulse produces a corresponding transient optical absorption or optical nutation pulse. A properly chosen train of Stark pulses will, however, produce photon echoes.

This technique is not restricted to any particular molecule or transition or to any one laser, and in fact the method is applicable to solids as well as gases. It is at least required (a) that the sample absorb the laser radiation, (b) that the sample be tunable by means of electric or magnetic fields, and (c) that the absorption vary with tuning. Thus, the method may be used even in the microwave region where klystrons rather than lasers are used.

Examples are shown with the molecules $C^{13}H_3F$ and also $NH_2D$. An infrared $CO_2$ laser oscillating in the $10\mu$ region is utilized. The Stark cell is driven by a pulse generator which produces one or more electronic pulses.

Figure 4:
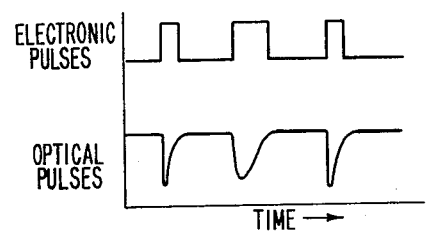

FIG. 4 compares electronic and optical pulses as a function of time for optical modulation applications.

Figure 5:
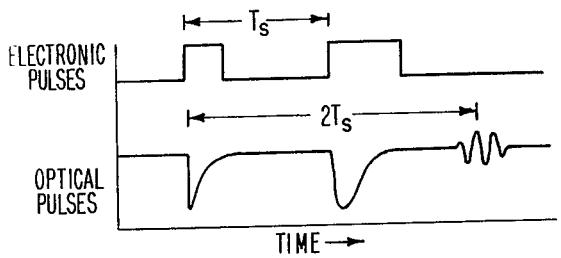

FIG. 5 compares electronic and optical pulses as a function of time for photon echo generation.

Figure 6:
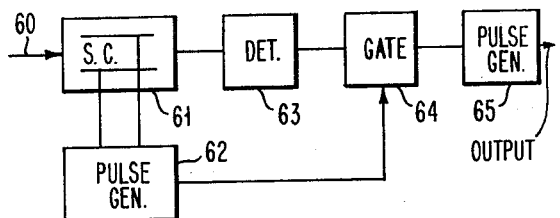

FIG. 6 depicts apparatus useful for pulse train inversion.

Figure 7:
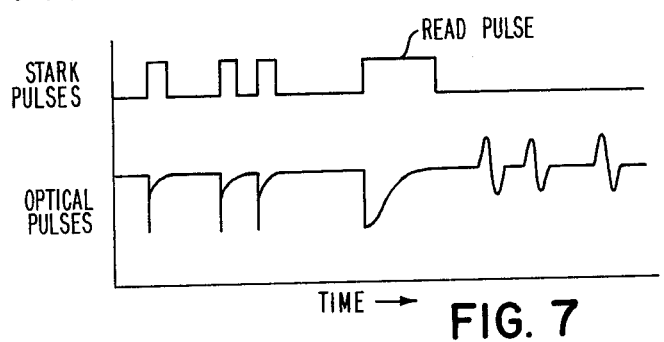

FIG. 7 compares Stark and optical pulses as a function of time for such a system.

FIG. 8 depicts apparatus of a recirculating storage type.

FIG. 9 compares start and read pulses, code pulses and optical pulses as a function of time for this system.

FIG. 10 shows the emission signal versus time for optical free induction decay, showing damped oscillation whose frequency is the Stark shift.

GENERAL DESCRIPTION

Since the initial demonstration of photon echo in ruby, the measurement of relaxation times with this effect has progressed rather slowly in contrast to spin echo studies. In fact, due to experimental difficulties, only two other examples of photon echo are known, one in $SF_6$ and the other in Cs vapor. Our invention discloses a new technique which produces these optical transient effects and which is applied not only to the study of photon echo and optical nutation but also to other coherent transient effects as well. The scope of this invention, for example, permits study of photon echo effects in the infrared which yield the relaxation time $T_2'$ of $C^{13}H_3F$ and permit an investigation of relaxation mechanisms in dilute gases. In addition, a clear demonstration of optical nutation is disclosed both for this molecule and for a non-degenerate transition of $NH_2D$. A knowledge of the transition assignments in these examples, unlike the $SF_6$ experiments, allows a comparison with theories of these transient effects.

Figure 1:
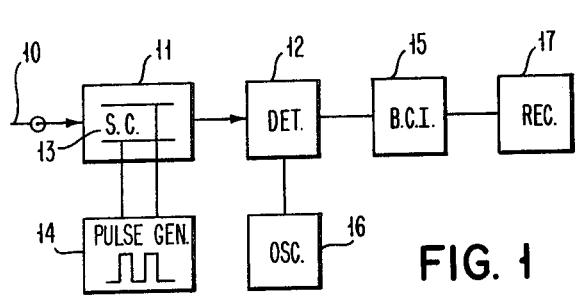
FIG. 1 depicts the apparatus for generating electromagnetic transient coherent effects including a Stark cell, pulse generator, detector and recorder.

Previous optical transient studies have required one or more coherent optical laser pulses. In our invention the exciting laser radiation is cw, and the molecular level splitting is pulsed. A schematic of the apparatus is shown in FIG. 1, described later. Thus, for molecules such as $CH_3F$, which exhibit a first order Stark effect, transient coherent optical signals are easily seen in transmission by electronically gating the optical absorption with a pulsed electric field.

Consider first the optical nutation effect for a Doppler broadened transition. FIG. 2a shows nutation sequences for $C^{13}H_3F$ and FIG. 2b the corresponding Stark pulse. To understand the sequence of events which occur, note that during the steady state absorption preceding the pulse, the laser excites within the Doppler lineshape only a single narrow velocity group of molecules which are in degenerate levels. Sudden application of Stark field removes this degeneracy causing new transition frequencies and correspondingly new velocity groups to be excited. (The Stark shift here is less than the Doppler width so that appreciable absorption still occurs.) If the pulse period is sufficiently long, the various transitions will independently produce oscillating macroscopic electric dipole moments, and several cycles of damped nutation may be optically monitored as the new steady state absorption value is approached. When the Stark pulse terminates the initial degenerate set will be restored and this velocity group will begin to nutate also. In this example, the $C^{13}H_3F$ pressure is 4.8 mTorr, the detector is apertured to a 1 mm diameter, and the pulse amplitude is $E = 35$ V/cm.

For the photon echo, the Stark pulse is shortened so that a $\pi/2$ pulse is created. Each transition of the degenerate set will evolve independently into a superradiant state which dephases following the pulse. The dephasing mechanism is Doppler broadening where the velocity spread is determined by the pulse width $\tau$. At a later time $\tau_s$ a second pulse of width $2\tau$ creates a $\pi$ pulse. It reverses the dephasing and restores the macroscopic electric dipole moment which emits an echo at time $\sim 2\tau_2$.

The observed echo, however, differs from the ordinary echo signal because its frequency is shifted from the laser frequency. The effect arises because the identity of the velocity groups excited during the two pulses is preserved afterward and the transition frequencies will be different in zero and non-zero Stark fields. The laser and echo radiation, therefore, produce a beat signal at the detector as the two beams are collinear and have the same polarization. Since the laser radiation is stronger than the echo intensity, a pulsed heterodyne signal appears, and hence, the detection sensitivity is greatly enhanced. This technique, therefore, monitors the echo amplitude $\epsilon$ due to heterodyne detection, rather than its intensity, and its decay envelope will be given by $$\epsilon/\epsilon_0 = e^{-2\tau_s/T_2'} \quad (1)$$

Figure 3:
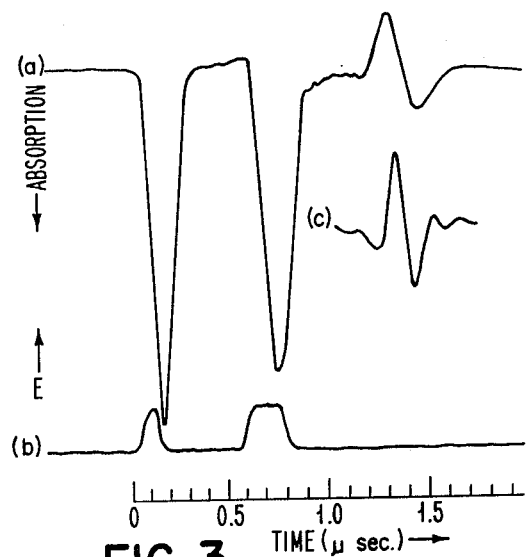
FIG. 3 shows the photon echo in $C^{13}H_3F$ on a multiple scale of Stark field E and absorption as a function of time.

An example of echo formation in $C^{13}H_3F$ is shown in FIG. 3 where the pressure is 5.2 m Torr. FIG. 3a shows the optical response to $\pi/2$ and $\pi$ pulses followed by the echo beat signal. FIG. 3b shows the corresponding Stark pulses where the interval $\tau_s = 570$ nsec and the pulse widths for $\tau$ and $\tau'$ are 90 and 180 nsec. Pulse amplitude is $E = 35$ V/cm. FIG. 3c depicts the echo signal for the case $E = 60$ V/cm. The other conditions are the same as above, but the beat frequency is $\sim 2$ times larger. The detector is not apertured down in (a) and (c).

Thus, the use of a cw laser with pulsed Stark fields is an advantageous method for producing coherent optical transient phenomena, and has the advantage of being simple to construct. The study of propagation effects such as self-induced transparency, where multiple $2\pi$ pulses are used, is feasible as well.

To produce these effects, the apparatus of FIG. 1 is utilized. Other apparatus configurations are possible for more specific applications. A single $CO_2$ laser beam 10 traverses a Stark cell 11 of only 10 cm length before being detected by a Ge-Au photoconductor 12 (risetime: $\sim 50$ nsec). The medium gas 13 of $C^{13}H_3F$ is 90 percent isotopically enriched. One of its $\nu_3$ band transitions $(J,K) = (4,3 \to 5,3)$ was assigned recently by optical double-resonance, and its Doppler lineshape (66MHz full width - half maximum) overlaps the P(32) $CO_2$ laser line at 1035.474 cm$^{-1}$. The laser transition oscillates in a single mode, is stable in frequency and amplitude, has a power density of 6.3 W/cm$^2$, a half-height beam diameter of 2.7 mm and is polarized at right angles to the pulsed Stark field so that $\Delta M = \pm 1$ transition occur. ($\Delta M = 0$ transitions can be excited if desired by rotating the laser polarization by 90°.) The Stark cell 11 is driven by a pulse generator 14 which produces one or more pulses, zero-based with electric fields up to 60 V/cm, and of variable width (80–2,000 nsec) and delay (0–4.5 $\mu$sec). Both nutation and echo signals are sufficiently large that video detection is possible while the use of a box car integrator 15, as in FIGS. 1 and 2, results in a signal-to-noise ratio of at least $10^3$. Both an oscilloscope 16 and a recorder 17 may be conveniently utilized to observe and record the effects produced. The above operating parameters and gases are given as examples and not limitations. For example, any laser having a frequency close to a molecular transition which can be Stark shifted into resonance may be used. Conditions will then vary as a function of particular gases.

Figure 2:
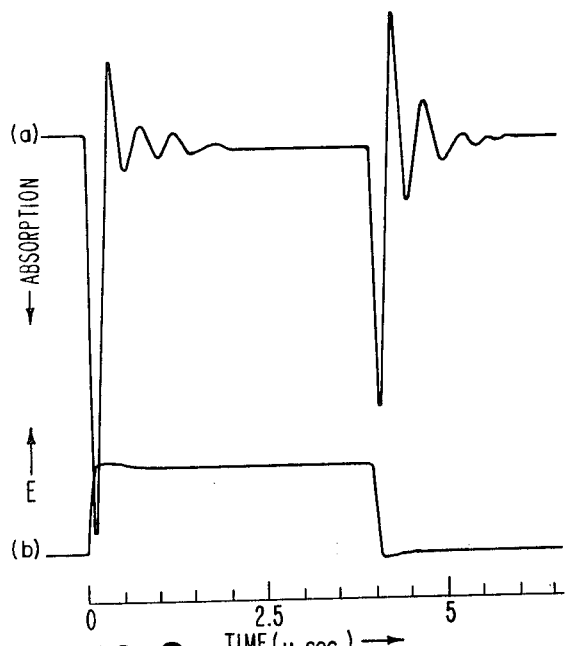
FIG. 2 shows optical nutation in $C^{13}H_3F$ on a multiple scale of Stark field E and absorption as a function of time.

The optical nutation effect for this $C^{13}H_3F$ transition was shown in FIG. 2, which has the appearance of an NMR nutation signal. Five equally spaced cycles with a period of 0.5 $\mu$sec are evident. As expected, the period of the nutation can be lengthened by reducing the incident light intensity.

An oversimplified calculation of these nutation signals may be obtained by considering a nondegenerate two-level system $(a,b)$ which is suddenly excited by an optical field $\epsilon = \epsilon_0 \sin\omega t$. If one neglects such quantities as the pulse rise time, propagation effects, the influence of Doppler broadening, and level degeneracy, the problem is then equivalent to transient nutation in NMR — a problem which has already been solved theoretically. The time dependent power absorbed following sudden excitation at time $t=0$ will be of the form $$P(t) = (n_1 - n_b)(Y^2 \hbar \omega_0)/\gamma \sin(2\gamma t) e^{-t/T_2'} \quad 2$$

where $\omega_o$ is the level splitting, $\gamma = \frac{1}{2}[(\omega-\omega_o)^2 + 4yy^*]$ one-half, $y = \mu_{ab}\epsilon_0/2\hbar$. The optical ringing pattern of Eq. (2) will thus resemble FIG. 2, the nutation frequency being $\Omega = \mu_{ab}\epsilon_0/\hbar$ at exact resonance. Each transition of the degenerate set nutates at a slightly different frequency ($\Omega = \mu_{ab}\epsilon/\hbar$), because of the variation in electric dipole matrix element $\mu_{ij}$. The nutational decay appears to be governed largely by spatial variations in the optical field as indicated by the sensitivity of the ringing patterns to detector position and to aperturing of the transmitted beam. For these reasons, quantitative measurements of $T_2'$ by this method are not feasible at present.

Consider now some of the characteristics of the photon echo experiments. A striking new feature is the beat phenomenon mentioned above. Verification of this effect was made by increasing the Stark pulse amplitude, which causes the transition frequency and the beat frequency to increase correspondingly. Comparison of FIGS. 3a and 3c shows that the echo beat increases from ~6 to 10 MHz when the pulse amplitude varies from 35 to 60 V/cm. This behavior compares favorably with the magnitude of calculated first order Stark shifts for the more intense transitions of the degenerate set.

The echo delay time is also in satisfactory agreement, to within ~1 percent, with the predicted value $(2\tau_s + \tau' - \tau/2)$ where $\tau_s$ is the interval between pulses and $\tau$ and $\tau'$ are the widths of first and second pulses. The duration of the echo is $\sim\tau$, as expected, when due allowance is made for the detector response time. In addition, we have demonstrated that the echo disappears when only one pulse is present and that its amplitude decreases as the first and second pulse areas $$\mu/\hbar \int_{-\infty}^{\infty} \epsilon \, dt$$

are varied from their $\pi/2$ and $\pi$ values, either through changes in the pulse widths or optical field $\epsilon$. Finally, from Equation (1) the dependence of echo amplitude (extrapolated to $\tau_s = 0$) on molecular density N is verified as being linear, and hence, the echo intensity varies as $N^2$ in accord with the theory of superradiance. It is of interest that N equals as few as $\sim 10^{10}/cm^3$ for an echo signal at 1 mTorr pressure. Thus, in all essential respects our results are in agreement with existing echo theory.

The echo measurements for $C^{13}H_3F$ exhibit a $T_2'$ pressure dependence which can be represented by $$1/\pi T_2' = 250 \text{ kHz} + (31 \text{ kHz/mTorr})p. \quad 3.$$

It is valid over at least one decade of pressure (0.5–10 mTorr). Here, the quantity $1/(\pi T_2')$ is the equivalent Lorentzian linewidth at full width-half maximum; the pressure independent value of 250 kHz reflects the molecular transit time across the laser beam; and the pressure broadening parameter $2\Delta\nu/p = 31$ kHz/mTorr.

Note that echo measurements of $T_2'$ should not be subject to power broadening effects and that Equation (3) does not require this correction as in linewidth determinations.

Equation (3) can be compared to the $C^{13}H_3F$ linebroadening parameter obtained from microwave measurements where the principal relaxation mechanism is rotational energy transfer and can be explained in terms of dipole-dipole interactions. The microwave value is $2\Delta\nu/p = 40$ kHz/mTorr for the $J,K = (0,0 \rightarrow 1,0)$ transition and is estimated to be 25 kHz/mTorr for the $J,K = (4,3 \rightarrow 5,3)$ transition. These numbers suggest that the rotational relaxation process is dominant for our infrared transition as well and that low angle elastic scattering (which changes the molecular velocity component along the beam direction) is not. Other mechanisms which contribute to a lesser degree include resonant vibrational energy transfer and disruptive binary collisions which bring about significant phase shifts.

It is interesting to note that optical linewidths derived from non-linear spectroscopic techniques, such as Lamb dip and double resonance, might be highly sensitive to low angle elastic scattering since $\sim 1/10^3$ of the Doppler width is sampled. Microwave spectroscopy, on the other hand, monitors the entire Doppler lineshape and is insensitive to velocity changing collisions. The echo experiment falls between the two cases since $\sim 1/15$ of the Doppler width is sampled; this may help to explain why elastic scattering is not of greater importance in our measurements.

APPLICATIONS

While the above general description discussed the generation of the basic effects and offered a theoretical explanation of the effects in this system, certain applications for the system may now be described.

1. Optical Pulse Generator, Optical Modulator, Data Communicator

In the form described in FIG. 1, the device is an optical pulse generator. The optical pulse amplitude, width and repetition rate may be varied by varying the corresponding quantity in the electronic pulse. Pulse widths from ~500 nsec down to a few nsec are feasible at arbitrary repetition rates where the pulse rise time is determined by roughly one-half the optical nutation period $\mu_{ij}\epsilon/\hbar$ as defined above.

Since the light is amplitude modulated by the molecular sample, the device is also an optical modulator. FIG. 4 shows the comparison of electronic pulses to optical pulses, on an intensity versus time scale. Since the amplitude modulation is a function of the frequency of Stark pulsing and the pulse voltage within the prescribed Doppler region, a data communication system may easily be assembled. In one embodiment, a computer by well known techniques generates a series of pulses to the Stark field, representing data. This pulsing modulates the laser beam, which is easily detected by a detector, converted back to electronic signals, and decoded by another computer.

Further modifications are evident. Additional intensity modulators may be used to modulate the beam prior to its entry into the Stark cell, or upon leaving the Stark cell. The same is true for polarizers and beam deflectors. All of these variations, however, are modifications of the basic concept involved.

The advantages of this data communications system are than evident. The laser utilized has a wide power range, the operating system is at room temperature, is simple to construct and similarly is inexpensive. Further, modulation is extremely rapid (for example, compared to varying the intensity of the laser output beam by varying laser energy input directly), and signal encoding simple.

2. Photon Echo Memory Device a. Photon Echo Effect

When two pulses of a specific width and amplitude are applied to the sample, a photon echo is observed. The first pulse places the system in a superradiant state which dephases due to inhomogeneous broadening. The second pulse causes this state to rephase at a later time and emit radiation. A unique feature of this echo is that the emitted radiation is at a different frequency than the laser radiation. This causes the echo to appear as a pulse modulated beat frequency at the detector. This is further illustrated in FIG. 5 comparing amplitude of electronic and optical pulses versus time.

b. Mirror Photon Echoes and Pulse Train Inverter

The first pulse may be replaced by several small pulses to form multiple mirror echoes, so called because the echoes appear in the reverse order from the encoding pulses. Thus a device which inverts the order of a pulse train is shown in FIG. 6, showing beam 60, Stark cell 61, pulse generator 62, detector 63, gate 64, and pulse generator 65. FIG. 7 relates the amplitude of the Stark pulses to the optical pulses and to time.

c. Stimulated Photon Echoes, Recirculating Storage Device

By using both a start pulse and a read pulse, echoes are produced in the same order as the code pulses. Using this technique, a recirculating storage device is made, as shown in FIG. 8. The apparatus includes cw laser 81, Stark cell 82, detector 83, pulse generator 84, code pulse means 85, start and read pulse generator 86. The sequence of operations is the following: A $\pi/2$ start pulse is applied, followed by the code pulses which are to be stored. The code pulses are much less than $\pi/2$ to avoid production of unwanted echoes. The read pulse is then applied and produces photon echoes corresponding to the initial code sequence. The code sequence is then stored again by triggering the pulse generator with the detector output. Thus, the code sequence is stored as it reproduces itself by means of this feedback loop. FIG. 9 shows the relation of alternate start and read pulses, to code pulses, to optical pulses, amplitude of each as a function of time.

3. Pulse Height to Frequency Converter

The photon echo signals observed with the above arrangements are beat signals. This occurs because the echo frequency is shifted from the laser frequency by the Stark shift. For a first-order Stark effect, this beat frequency is proportional to the Stark pulse amplitude. Thus, the pulse height is encoded on the optical beam as a beat frequency and upon detection can be recovered.

4. Molecular Spectroscopy

By Stark shifting molecular energy levels in and out of resonance with a cw laser beam, transient optical phenomena such as photon echoes and optical nutation have been detected as described above. In addition, observations of optical free induction decay for the $\nu_2$ band transition $(J,M) = (4,4 \rightarrow 5,5)$ of $NH_2D$ at 10$\mu$m have been made using the identical apparatus shown in FIG. 1. This emission accompanies the optical nutation signal following a Stark pulse and is the optical analog of free induction decay in NMR. Whereas the nutation signal arises from molecules which are switched into resonance by the Stark field, the emission signal results from those that are switched out. This emission (FIG. 10) is easily identified because it beats with the laser, producing a damped oscillation whose frequency is the Stark shift. The technique of coherent emission can be used for ultrahigh resolution molecular spectroscopy as the Stark shift can be measured with precision from the beat frequency and the molecular relaxation time from its decay envelope.

While the example shown has been with the molecule $NH_2D$, the same technique may be applied in general to any molecule possessing an electric dipole moment. When applied in conjunction with a tunable laser source (dye laser, spin-flip, etc.) these methods may be applied over a broad spectral range and become even more useful spectroscopically.

All the techniques of Fourier transform spectroscopy can be applied here as well, including the use of small computers in data reduction. This allows exceedingly high resolution spectra of closely spaced spectral lines to be resolved quickly by transforming the free induction decay signals, which are in the time domain, (FIG. 10) to a spectrum in the frequency domain.

5. Superradiance

The coherent spontaneous emission effect described above in (4) is a type of laser itself, one which resembles R. H. Dicke's superradiant or coherence brightened laser concept (see U. S. Pat. No. 2,851,652, issued Sept. 9, 1958). This emission is coherent, intense, monochromatic, and directional, as in An ordinary laser, but the method for preparing the excited molecular system is different. The preparation is described in (4). The present technique (FIG. 1), therefore, allows one to realize in a simple way a true superradiant type laser, namely, a laser which does not employ mirrors for feedback amplification. Moreover, the intensity could be increased by many orders of magnitude through the use of longer sample lengths and higher pump power.

6. Optical Radar

The techniques above are useful for an optical radar in which a modulated laser beam (as in 1) is reflected off a moving target and is detected upon its return. The motion of the target object is determined by comparing in time a train of the reflected pulses with a similar train which had been stored in a recirculating optical memory element (as in 2c).

DIGEST

Other applications will become evident to those skilled in the art. All of these devices and applications however rest in the basic invention herein. Thus, it has broadly been described as a method for producing electromagnetic transient coherent effects comprising the steps of directing a coherent directional electromagnetic beam into a Stark cell containing a resonant frequency tunable medium, and applying a voltage to the Stark cell to selectively tune the medium into resonance with the incoming beam. While a specific laser example has been utilized in the above, with a matching gas, other combinations are readily apparent to those skilled in the art. The examples shown are illustrative and not limiting. Further, the electromagnetic beams may either be a laser beam or microwave beam, once again matching the particular Stark cell medium to the incoming beam. If the voltage applied to the Stark cell is applied as a step function Stark field, a nutation signal and optical free induction decay will occur in the gas medium. If Stark pulses are applied at a pulse interval less than the molecular relaxation time of the gas, a photon echo is generated. When three Stark pulses are applied, with pulse intervals less than the molecular relaxation time of the gas, a stimulated photon echo will thus be generated in the gas used.

In particular, the examples above have utilized the highly efficient and broad usage $CO_2$ laser with a gas chosen from a group consisting of $C^{13}H_3F$ and $NH_2D$.

In application, one may optically modulate the beam for use as a modulator by directing the coherent directional electromagnetic beam into the Stark cell which contains the resonant frequency tunable medium. Then, by applying a voltage to the Stark cell to selectively tune the medium into or out of resonance with the incoming beam, optical modulation occurs. For data transmission, one need only apply the voltage pulses to the Stark cell to selectively tune the medium into and out of resonance with the incoming beam. The magnitude and frequency of the voltage pulses are representative of data to be transmitted by the beam. In turn of course, the testing and demodulating beams are used to convert the beams into data representative of the original data.

While the method has been shown, it is clear from FIG. 1 that a simple and inexpensive and highly reliable apparatus can be made. Broadly, an apparatus for producing electromagnetic transient coherent effects comprises means for generating a coherent directional electromagnetic beam, such as a laser or microwave generator, and modulating means comprising a resonant frequency tunable medium located to intercept the beam, further including means for tuning the resonant frequency tunable medium. The resonant frequency tunable medium tuning beam may also tune the medium in response to a predetermined data pattern. Such apparatus of course may further include the testing means and means for converting the modulated beam into data representative of the predetermined data pattern.

What is claimed is:

1. A method for producing electromagnetic transient coherent effects comprising the steps of:
    directing a coherent directional electromagnetic beam into a Stark cell containing a resonant frequency tunable medium, and
    applying a voltage pulse with a risetime of less than the molecular relaxation time of the resonant frequency tunable medium to the Stark cell to selectively tune the medium into or out of resonance with the incoming beam.

2. The method of claim 1 wherein the electromagnetic beam is a laser beam.

3. The method of claim 1 wherein the electromagnetic beam is a microwave beam.

4. The method of claim 1 wherein the step of applying a voltage to the Stark cell is applying the voltage as a step function Stark field whereby a nutation signal and optical free induction decay occur in the medium.

5. The method of claim 1 wherein the step of applying a voltage to the Stark cell is applying two Stark pulses whose pulse interval is less than the molecular relaxation time of the medium, whereby a photon echo is generated in the gas.

6. The method of claim 1 wherein the step of applying a voltage to the Stark cell is applying three Stark pulses whose pulse interval is less than the molecular relaxation time of the medium, whereby a stimulated photon echo is generated in the medium.

7. The method of claim 1 wherein the tunable medium is a gas medium.

8. The method of claim 2 wherein the electromagnetic beam is a $CO_2$ laser and the medium is a gas chosen from the group consisting of $C^{13}H_3F$ and $NH_2D$.

9. The method of optically modulating a coherent electromagnetic beam comprising the steps of:
    directing a coherent directional electromagnetic beam into a Stark cell containing a resonant frequency tunable medium;
    applying a voltage pulse with a risetime of less than the molecular relaxation time of the resonant frequency tunable medium to the Stark cell to selectively tune the medium into or out of resonance with the incoming beam.

10. A method of optically modulating a coherent electromagnetic beam to transmit data thereby comprising the steps of:
    directing a coherent directional electromagnetic beam into a Stark cell containing a resonant frequency tunable medium;
    applying voltage pulses having a risetime of less than the molecular relaxation time of the resonant frequency tunable medium to the Stark cell to selectively tune the medium into or out of resonance with the incoming beam to generate a modulated beam, the magnitude and frequency of the voltage pulses representative of data to be transmitted by the beam; and
    detecting and demodulating the beam transmitted through the Stark cell to convert the beam into data representative of the original data.

11. The method of claim 10 wherein the tunable medium is a gas medium.

12. The method of claim 10 wherein the coherent directional electromagnetic beam is a laser.

13. Apparatus for producing electromagnetic transient coherent effects comprising:
    means for generating a coherent directional electromagnetic beam; and
    modulating means comprising a resonant frequency tunable medium located to intercept the beam, including means for tuning the resonant frequency tunable medium into or out of resonance in a pulse interval having a risetime of less than the molecular relaxation time of the medium.

14. The apparatus of claim 13 wherein the means for generating a coherent directional electromagnetic beam is a laser.

15. The apparatus of claim 13 wherein the means for generating a coherent directional electromagnetic beam is a microwave generator.

16. The apparatus of claim 13 wherein the modulating means is a Stark cell.

17. The apparatus of claim 13 wherein the resonant frequency tunable medium is a gas medium.

18. The apparatus of claim 13 wherein the means for tuning the resonant frequency tunable medium tunes the medium in response to a predetermined data pattern.

19. The apparatus of claim 18 including means for detecting the beam after the beam is intercepted by the modulating means.

20. The apparatus of claim 19 including means for converting the modulated beam into data representative of the predetermined data pattern.

* * * * *

UNITED STATES PATENT OFFICE
CERTIFICATE OF CORRECTION

Patent No. 3,766,498     Dated   October 16, 1973

Inventor(s)   RICHARD G. BREWER ET AL

It is certified that error appears in the above-identified patent and that said Letters Patent are hereby corrected as shown below:

In col. 5, line 6, equation 2, please delete
" $P(t) = (n_1-n_b)(\gamma^2 h\omega_0)/\gamma \sin(2\gamma t) e^{-t/T_2'}$ " and substitute therefor -- $P(t) = (n_a-n_b)\left(\dfrac{\gamma^2 h\omega_0}{\gamma}\right) \sin(2\gamma t) e^{-t/T_2'}$  --.

(2)

In col. 5, line 9, delete "$\gamma = 1/2 [(\omega-\omega_0)^2 + 4\gamma\gamma^*]$" and substitute therefor -- $\gamma = \dfrac{1}{2}[(\omega-\omega_0)^2 + 4yy^*]^{1/2}$  --.

In column 5, line 10, delete "one-half".
In col. 5, line 14, delete " $(\Omega = \mu_{ab}\epsilon/\hbar)$ " and substitute therefor -- $(\Omega = \mu_{ij}\epsilon/\hbar)$  --.

In col. 7, line 2, delete "than".

Signed and sealed this 30th day of July 1974.

(SEAL)
Attest:

McCOY M. GIBSON, JR.                C. MARSHALL DANN
Attesting Officer                   Commissioner of Patents